United States Patent [19]
Yamada

[11] Patent Number: 6,048,067
[45] Date of Patent: Apr. 11, 2000

[54] SEPARATE TYPE PROJECTION IMAGE DISPLAY DEVICE AND METHOD OF SWITCHING IMAGE OF THE DEVICE TO A PROPER DIRECTION

[75] Inventor: Yasutomo Yamada, Tokyo, Japan

[73] Assignee: NEC Corporation, Tokyo, Japan

[21] Appl. No.: 09/140,649

[22] Filed: Aug. 26, 1998

[30] Foreign Application Priority Data

Aug. 26, 1997 [JP] Japan .................................. 9-229058

[51] Int. Cl.[7] .................................................. G03B 21/14
[52] U.S. Cl. ............................. 353/30; 353/122; 345/115
[58] Field of Search .......................... 353/69, 122, 103, 353/30; 345/11, 13, 14, 27, 115, 902, 9, 5, 3; 348/745, 806

[56] References Cited

U.S. PATENT DOCUMENTS

| | | |
|---|---|---|
| 4,599,612 | 7/1986 | Kaji et al. .............................. 434/157 |
| 4,638,308 | 1/1987 | Kuwabara et al. . |
| 5,467,152 | 11/1995 | Wilson et al. ............................ 353/103 |
| 5,696,531 | 12/1997 | Suzuki et al. ............................ 345/132 |
| 5,730,517 | 3/1998 | Berglund .................................. 353/69 |
| 5,956,180 | 9/1999 | Bass et al. ................................ 353/30 |
| 5,986,634 | 11/1999 | Alioshin et al. ......................... 345/126 |

*Primary Examiner*—William C. Dowling
*Attorney, Agent, or Firm*—Sughrue, Mion, Zinn, Macpeak & Seas, PLLC

[57] ABSTRACT

In a projection image display device for displaying a normal image of a proper direction, an inverted image is previously stored together with a reference image and displayed along with the reference image as a selectable option of a selection screen. If any inversion is made, there exists a selectable option which can be correctly viewed. By selecting the same option, it is switched to a correct image.

15 Claims, 8 Drawing Sheets

SEPARATE TYPE PROJECTION IMAGE DISPLAY DEVICE AND METHOD OF SWITCHING IMAGE OF THE DEVICE TO A PROPER DIRECTION

BACKGROUND OF THE INVENTION

1. Field of the Invention

This invention relates to a projection image display device and a method of switching an image displayed on the device to a proper direction, and more particularly to a separate type projection image display device and a method of switching an image displayed on the device to a proper direction.

2. Prior Art

In general, conventional separate projection image display devices are classified into a front type device and a rear type device. Each of the front type and the rear type devices is further classified into a hanging front type one, an on-floor rear type one, a hanging rear type one, and an on-floor front type one. In any case, the separate type projection image display apparatus utilizes a cathode ray tube (CRT) projector or a liquid crystal projector. The CRT projector has a CRT from which RGB color lights are radiated and then focused by a lens to project RGB color images on a screen.

The liquid crystal projector has a liquid crystal panel to which light is radiated from a backward light source to be focused by a lens. Thus, an image is projected on a screen through the liquid crystal panel. On projecting a color image, RGB polarizing light components must be transmitted through a respective liquid crystal panel to form RGB images. These RGB images are focused by a lens and combined together on a screen.

Herein, it is to be noted that an image is not always displayed on a screen as a normal image but may be displayed upside down or inside out when each projection image display device is wrongly set. In other words, each projection image display device must be set or installed in place in consideration of the type of each projection image display unit so as to project and display such a normal image. Otherwise, an inverted image is displayed on the screen and may be inverted in a vertical direction and/or a horizontal direction.

In order to prevent an inverted image from being displayed, an operator should consider or recognize each type of the projection image display devices so as to normally display an image.

Consequently, the conventional separate type projection image display device is disadvantageous in that each type of the projection image display devices should be recognized by the operator and is installed or set in place in a situation determined at each type of the projection image display devices. Further, it is often difficult for an operator to be accustomed to every one of the projection image display devices. This brings about difficulty in handling the device.

SUMMARY OF THE INVENTION

Therefore, it is an object of the present invention to provide a projection image display device which is easy to operate without a necessity of considering a setting state or without any skills.

Further, it is another object of the present invention to provide a method of readily switching the above projection image device to a proper direction.

Further, it is still another object of the present invention to provide a projection image display device which can simultaneously display a plurality of images including a correct or normal image regardless of the device types and which can select the correct image from the displayed images.

In addition, it is yet another object of the present invention to provide a method of switching an image of the above projection image display device to a proper direction.

In order to achieve the above objects, a projection image display device according to an aspect of this invention is for use in projecting an image on a screen and comprises memory means for storing reference display information representative of a reference image and inverted display information representative of an inverted image obtaining by inverting the reference image in a predetermined direction, to produce combined display information representative of combination of the reference image and the inverted image, and display means for projecting the combined display information onto the screen to display the combined image on the screen.

In this event, the predetermined direction is a horizontal direction and/or a vertical direction. As a result, the inverted image is inverted in the horizontal direction and/or the vertical direction. Preferably, the predetermined direction is both horizontal and vertical directions and the inverted image is composed of first, second, and third partial inverted images which are inverted in the vertical direction, in the horizontal direction, and both the horizontal and the vertical directions, respectively.

Under the circumstances, the display means is preferably operable to selectively display the image in a reference mode for the reference image and in first through third inverted modes for the first through the third partial inverted images. The projection image display device further comprises means for responding to selection of one of the images displayed on the screen to produce a switching signal corresponding to the selected image, and operating means responsive to the switching signal for operating the display means in a selected one of the reference mode and the first through the third inverted modes that is specified by the switching signal.

According to another aspect of this invention, a method is for use in switching an image of a projection image display device to a proper direction and comprises the steps of storing reference display information representative of a reference image and inverted display information representative of an inverted image obtaining by inverting the reference image in a predetermined direction, producing combined display information representative of combination of the reference image and the inverted image, and projecting the combined display information onto the screen to display the combined image on the screen in the proper direction.

BRIEF DESCRIPTION OF THE DRAWINGS

FIG. 8 is an illustrative view showing examples of selectable options which are previously registered in the projection image display device of FIG. 7 and to which there are added inversions or the like.

DESCRIPTION OF THE PREFERRED EMBODIMENT

Before describing a preferred embodiment of the present invention, a conventional separate type projection image display device will be explained with reference to FIGS. 1 to 4, in order to facilitate understanding of the present invention.

Figure 1:
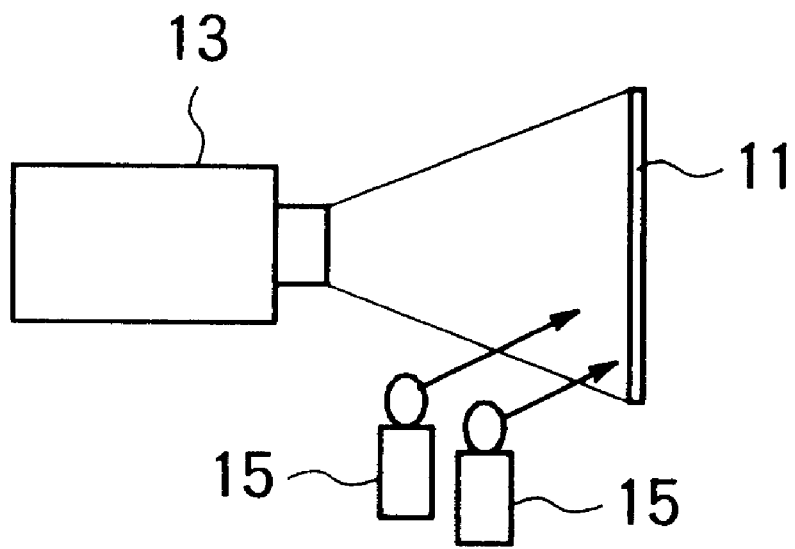
FIG. 1 is a structural view schematically showing a front-type reflecting image display device according to a related art.

In FIG. 1, a front type display device is illustrated which has a projector, namely, a projection image display device main body 13 and a screen 11 located in front of the projector. With this type, images are projected on the screen 11 from the projector or projection image display device main body 13. Viewers or audiences 15 can watch or see the projected images in front of the screen. This means that the viewers 15 can see the projected images in the same direction as a direction of projection.

Figure 2:
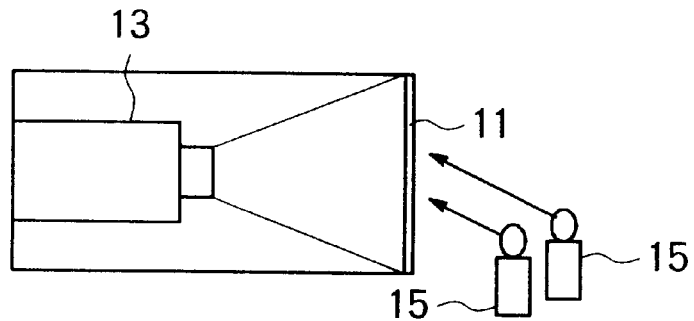
FIG. 2 is a structural view schematically showing a rear-type reflecting image display device according to a related art.
Figure 3:
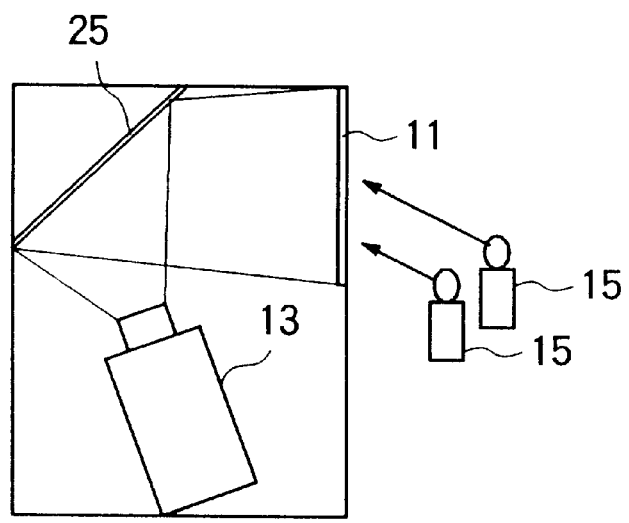
FIG. 3 is a structural view schematically showing a rear-type reflecting image display device employing a mirror according to a related art.

In each of FIGS. 2 and 3, a rear type projection image display device is shown wherein a viewer 15 can view, from a rear surface side of a screen 11, an actual image projected on the screen 11 from a projector or projection image display device main body 13.

It is to be noted that each projection image display device must be set in place or located at a correct position determined for each projection image display device.

In each projection image display device of the above mentioned types, consideration might be made about displaying a list of images representative of a relation of setting states between the screens 11 and the devices 13 and about selecting the list. In this case, such images in the list are displayed as selection branches.

However, an actual image of the selection branches can not be considered which is projected on the screen. For example, the image of the selection branches can not be understood, when the image is projected on the screen in a vertically inverted state which is upside down, as shown in FIG. 4.

Figure 4:
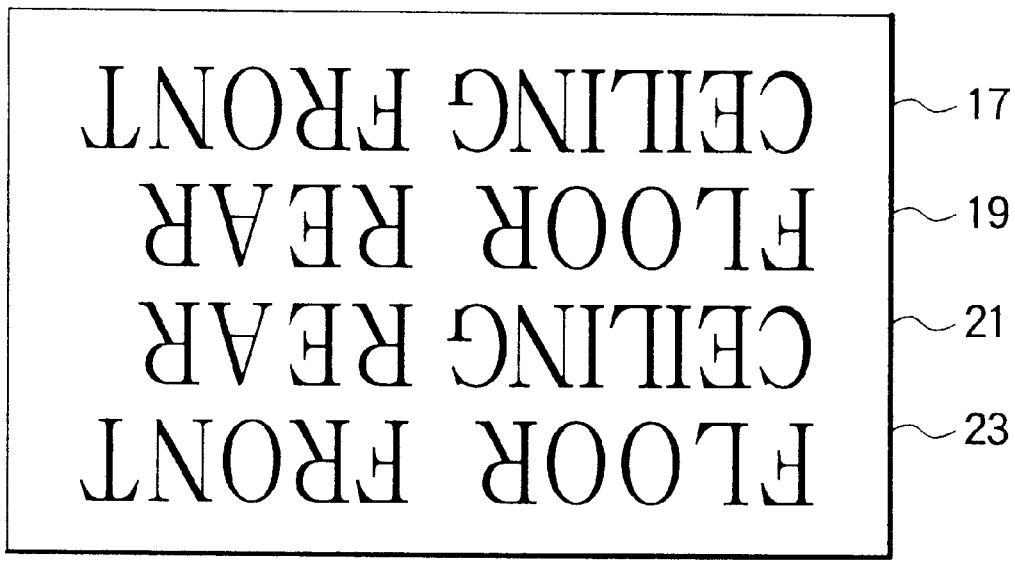
FIG. 4 is an illustrative view showing selectable options of a selection screen according to a related art.

Specifically, various options are displayed as the selection branches on the screen 11, as shown in FIG. 4 and include an option 17 representative of a hanging front or ceiling front type, an option 19 representative of an onfloor rear type, an option 21 representative of a hanging rear or ceiling rear type, and an option 23 representative of an on-floor front type.

In order to select a correct one of the options from the list, an operator should recognize a relationship between the actual image and each type of the projection image display devices and therefore should be familiar with each type.

Under the circumstances, it is not easy for the operator to select a correct setting state of the device from the list of the selection branches.

Now, a preferred embodiment of the present invention will be explained with reference to FIGS. 5 to 9.

Figure 9:
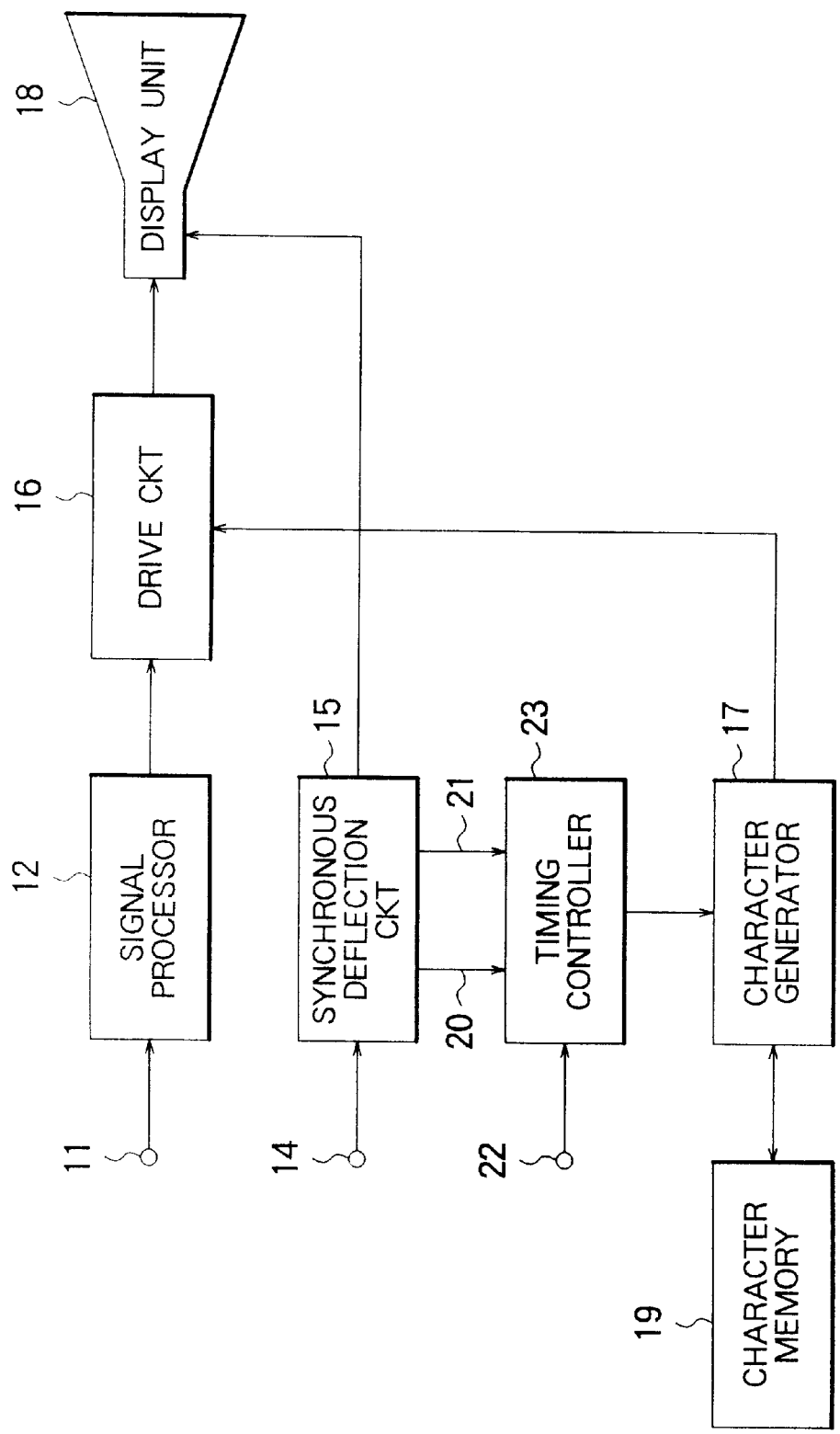
FIG. 9 is a block diagram of a projection image display device according to the embodiment of the present invention.

As shown in FIG. 9, the projection image display device operable in response to an input video signal 11, a control signal 14, and a character command 22 to drive a display unit 18, such as a cathode ray tube (CRT). The input video signal 11 is sent to a signal processor 12 to be subjected to image processing in a known manner and to be delivered to a drive circuit 16 as a processor output signal.

On the other hand, the control signal 14 includes an input synchronization signal along with a switching control signal (will be mentioned after) and is supplied to a synchronous deflection circuit 15 which produces a horizontal synchronization signal 20 and a vertical synchronization signal 21 in a known manner. In the illustrated example, the synchronous deflection circuit 15 further supplies a deflection output drive signal to the CRT 18 in a manner to be mentioned with reference to FIGS. 5 and 6.

The horizontal and the vertical synchronization signals 20 and 21 separated by the synchronous deflection circuit 15 are sent to a timing controller 23 which is operable in response to the character command 22 given from a microcomputer (not shown in this figure).

The timing controller 23 delivers a controller output signal to a character generator 17 in response to the character command in synchronism with the horizontal and the vertical synchronization signals 20 and 21. The character generator 17 is operated in response to the controller output signal to access a character memory 19 and to produce a generator output signal. The generator output signal is representative of a character read out of the character memory 19 and is sent to the drive circuit 16 to be superposed on the processor output signal sent from the signal processor 12.

At any rate, the CRT 18 displays characters which are sent from the character generator 17 and which are projected on a screen (not shown).

Herein, the signal processor 12, the drive circuit 16, the display unit 18, the timing controller 23, and the character generator 17 will be collectively called a display portion while the character memory 19 will be referred to as a memory unit connected to the microcomputer.

In the illustrated character memory 19, a reference image is stored together with an inverted image which is obtained by inverting the reference image in a horizontal direction and/or a vertical direction. Specifically, the inverted image is composed of first, second, and third partial inverted images which are produced by inverting the reference image in the horizontal direction, in the vertical direction, and in both of the horizontal and the vertical directions, respectively. Each of the reference image and the first through the third partial inverted images is stored in the character memory 19 as reference information and first through third partial inverted information, respectively.

Figure 8:
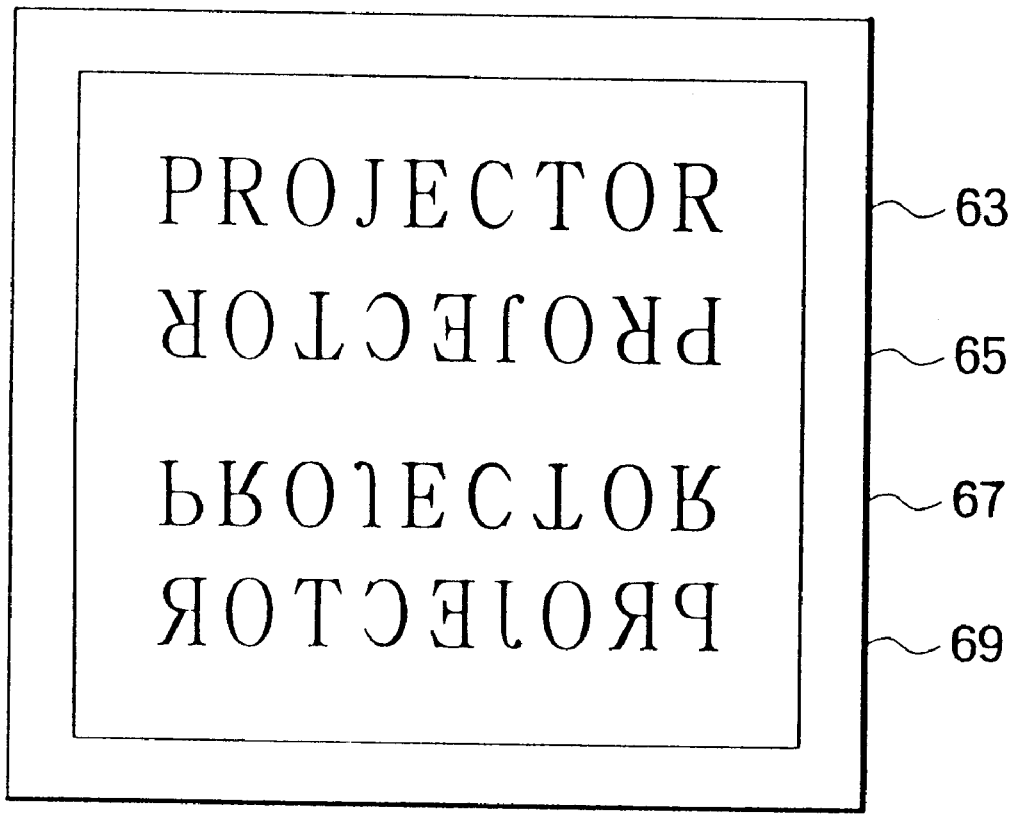

Such reference and first through third partial inverted images will be explained with reference to FIG. 8. In FIG. 8, the reference image is depicted by 63 while the first through the third partial inverted images are depicted by 69, 67, and 65, respectively.

Referring back to FIG. 9, the illustrated synchronous deflection circuit 15 serves to set an image into a proper or normal direction and will be called an image setting portion.

Figure 5:
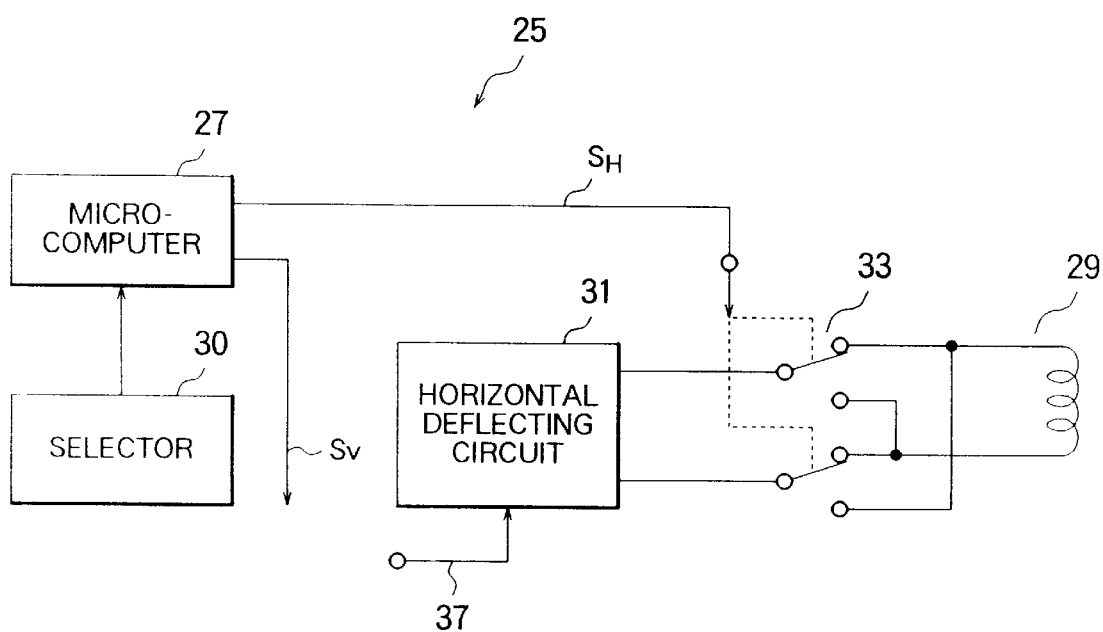
FIG. 5 is a diagram showing a horizontal switch circuit of an image setting means of a projection image display device according to an embodiment of the present invention.
Figure 6:
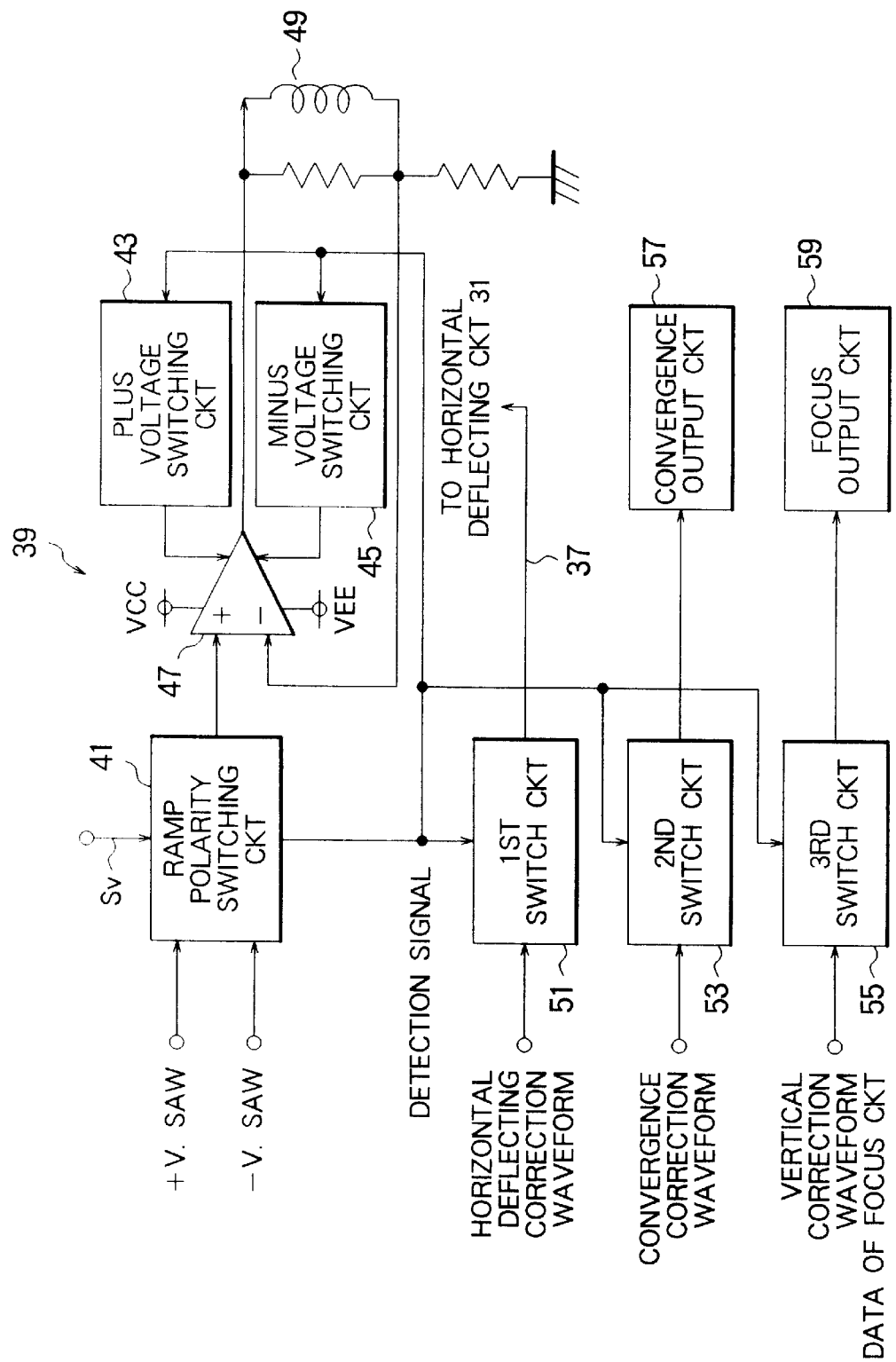
FIG. 6 is a diagram showing a vertical switch circuit of an image setting means of a projection image display device according to an embodiment of the present invention.

The image setting portion 15 comprises a horizontal switch circuit 25 and a vertical switch circuit 39 which are illustrated in FIGS. 5 and 6, respectively, and which carries out horizontal switching and vertical switching to control the image on the screen in a proper or normal direction, respectively. To this end, the microcomputer 27 illustrated in FIG.

5 produces, as the switching control signal, a horizontal deflection polarity switching signal SH and a vertical deflection polarity switching signal SV. The horizontal deflection polarity switching signal SH is indicative of a polarity of deflection current or voltage given to a horizontal deflecting coil 29 (FIG. 5) included in the CRT 18 while the vertical deflection polarity switching signal SV is indicative of a polarity of deflection current or voltage given to a vertical deflecting coil 49 (FIG. 6) included in the CRT 18 also.

In addition, a selector 30 is connected to the microcomputer 27, as illustrated in FIG. 5 and has predetermined option switches which correspond to the reference and the first through the third partial inverted images, respectively. In any event, the selector 30 produces a selection signal representative of a selected one of the option switches. Specifically, the selection signal is representative of an on or an off state of the horizontal deflecting polarity switch signal SH and an on or an off state of the vertical deflecting polarity switch signal SV and is supplied to the microcomputer 27.

Now, the image setting portion 15 (FIG. 9) according to the embodiment of the preset invention will be explained in detail with reference to FIGS. 5 and 6.

In FIG. 5, the horizontal switch circuit 25 included in the image setting portion 15 serves to switch the polarity of the current or the voltage given to the horizontal deflection coil 29 from one to another in response to the horizontal deflecting polarity switch signal SH.

For this purpose, the horizontal switch circuit 25 is connected to the horizontal deflecting coil 29 and comprises a horizontal deflecting circuit 31 for supplying the deflecting current or voltage to the horizontal deflecting coil 29 and a horizontal deflecting switch 33 connected to the microcomputer 27 to switch the polarity of the deflecting current or voltage given to the horizontal deflecting coil 29 in response to the horizontal deflecting polarity signal SH.

Referring to FIG. 6, the vertical switch circuit 39 comprises a ramp polarity switching circuit 41, a plus voltage switching circuit 43, a minus voltage switching circuit 45, and a vertical deflecting output amplifier 47 connected to the vertical deflecting coil 49. In addition, the illustrated vertical switch circuit 39 further includes first through third switch circuits 51, 53, and 55. Herein, the first through the third switch circuits 51, 53, and 55 are operable in a manner to be described hereinafter and are connected to the horizontal deflecting circuit 31 (FIG. 5), a convergence output circuit 57, and a focus output circuit 59, respectively.

In the vertical switch circuit 39 shown in FIG. 6, the vertical deflection polarity switching signal SV is given to the ramp polarity switching circuit 41. The illustrated ramp polarity switching circuit 41 is supplied with a plus ramp waveform, namely, a saw-tooth waveform of a positive polarity (referred to also as +V. SAW) and a minus ramp waveform, namely, a saw-tooth waveform of a plus ramp waveform, namely, a saw-tooth waveform of a negative polarity (hereinafter referred to as −V. SAW).

The ramp polarity switching circuit 41 selects either one of the plus and the minus ramp waveforms +V. SAW and −V. SAW in response to the vertical deflection polarity switching signal SV to produce a selected waveform. The selected waveform is delivered to the vertical deflecting amplifier 47 controlled by the plus and the minus voltage switching circuits 43 and 45. In addition, the illustrated ramp polarity switching circuit 41 also produces a detection signal which is representative of a polarity of the vertical deflection and which is sent to the first through the third switch circuits 51, 53, and 55 and also to the plus voltage switching circuit 43 and the minus voltage switching circuit 45.

The illustrated vertical deflecting amplifier 47 can amplify both the ±V. SAW which are sent from the input ramp polarity switching circuit 41 under control of the plus and the minus voltage switching circuits 43 and 45 selectively operable in response to the detection signal given from the ramp polarity switching circuit 41. As a result, the deflecting amplifier 47 produces an amplified deflection voltage and supplies the same to the vertical deflecting coil 49.

Responsive to the amplified deflection voltage, the vertical deflecting coil 49 vertically deflects an electron beam emitted from an electron gun of the CRT and thereby controls raster over a CRT fluorescent material.

In addition, the plus voltage switching circuit 43 serves to increase a plus output stage voltage only for a vertical retrace period when +V. SAW is given to the vertical deflecting output amplifier 47. During the vertical retrace period of the plus voltage switching circuit 43, the minus output stage voltage is kept inactive.

On the other hand, the minus voltage switching circuit 45 serves to increase a minus output stage voltage only for a vertical retrace period when −V. SAW is inputted to the vertical deflecting output amplifier 47. During the vertical retrace period, the plus output stage voltage does not effect power switching.

In FIG. 6, the first switch circuit 51 is operable in response to the detection signal sent from the ramp polarity switching circuit 41 and serves to automatically detect a time instant at which the plus and the minus ramp waveforms are switched from one to another. Thereafter, the first switch circuit 51 switches vertical data concerned with a correction waveform of the horizontal deflecting circuit 31. Thus, the vertical data of the correction waveform of the horizontal deflecting circuit 31 is switched or replaced in response to the detection signal.

The second switch circuit 53 is operable in response to a convergence correction waveform and the detection signal to automatically detect the switching time instant between the plus and the minus ramp waveforms and to switch vertical data concerned with the convergence correction waveform. Thus, the vertical data of the convergence correction waveform is also switched in response to the detection signal to be sent to the convergence output circuit 57.

Furthermore, the third circuit 55 is operable to switch vertical correction waveform data of a focus circuit. Like the first and the second circuits 51 and 53, the third circuit 55 detects the switching time instant between the plus and the minus ramp waveforms and to thereafter switch the vertical correction waveform data of the focus circuit and outputs a switched waveform to the focus output circuit 59.

The horizontal deflecting correction waveform, the convergence correction waveform, and the vertical correction waveform are generated by a waveform generator (not shown) which is known in the art.

The vertical switch circuit 39 shown in FIG. 6 receives the vertical deflection polarity switching signal SV and switches the polarity of V. SAW. This makes it possible to switch the polarity of the vertical deflection and the polarity of the vertical data of the correction waveforms concerned with the horizontal deflection circuit, the convergence circuit, and the focus circuit.

Figure 7:
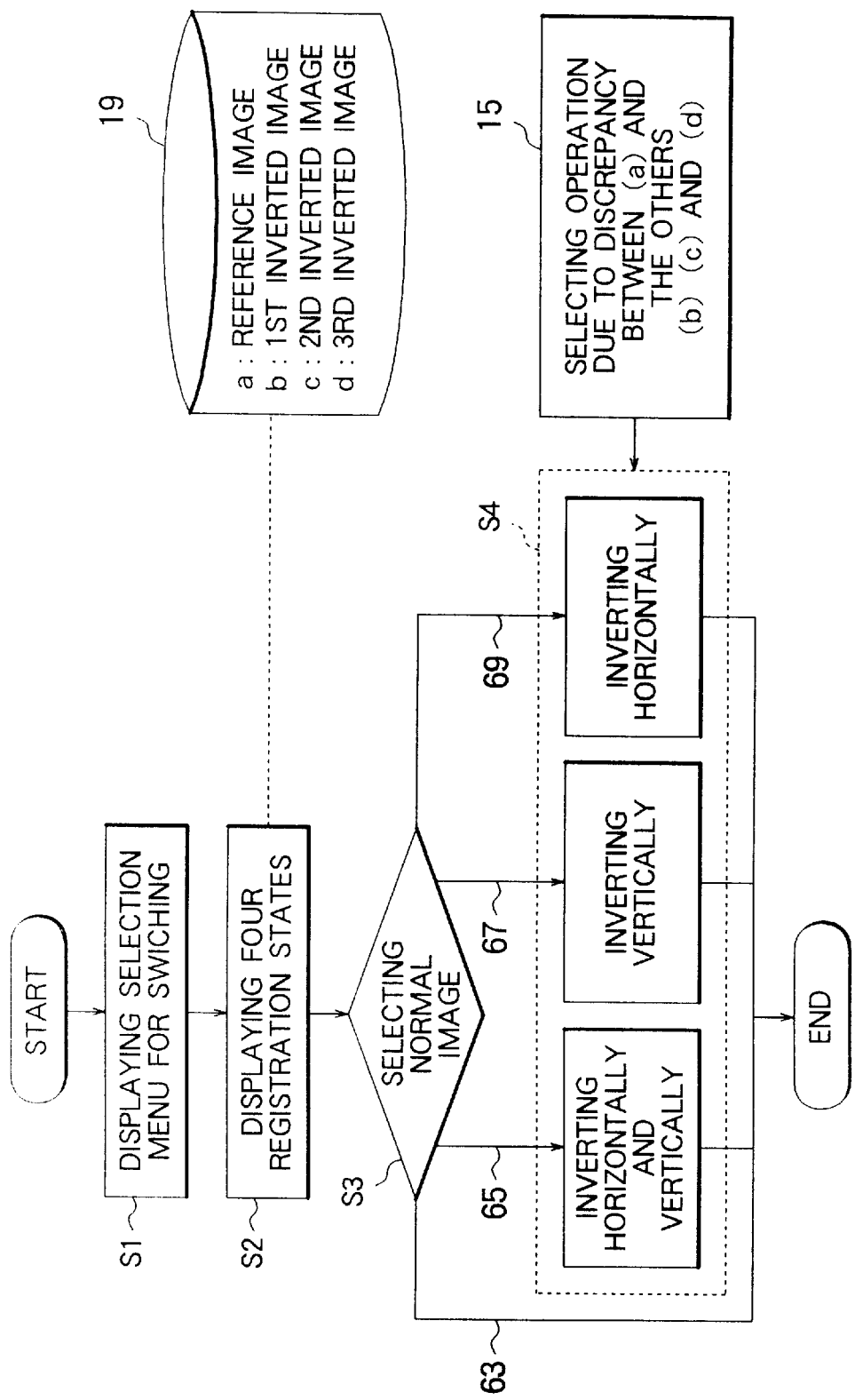
FIG. 7 is a flowchart showing a switching operation of the projection image display device according to the embodiment of the present invention.

Referring to FIG. 7, the projection image display device is provided with the display unit, such as the CRT 18, as illustrated in FIG. 9. On the CRT 18, a selection menu is at first displayed in the form of a menu image to be selected by an operator (step S1). Next, the four registration states are read out of the character memory, namely, the memory unit 19 (FIG. 9) and are displayed on the CRT 18 as the reference image 63 and the first through the third partial inverted images 69, 67, and 65, as shown in FIG. 8, respectively (step S2).

Since there exists an option or an image that can be viewed correctly within the displayed images 63, 65, 67, 16 and 69 without fail, the operator selects a normal image of a normal direction from the displayed images by the use of the selector 30 (FIG. 5) (step S3). Since a discrepancy between the selected one by the operator and the reference image means a discrepancy between the set state of the projection image display device and an actual display state, operation is made so as to reflect the discrepancy in the image. As a result, a correct or a normal image is displayed on the screen by the use of the image setting portion 15 (FIG. 9)(step S4).

Specifically, it is assumed in FIG. 8 that the reference image 63 is selected by the operator by the use of the selector 30. In this event, the image setting portion 15 can display the following images without switching the polarities of the horizontal and the deflection voltages.

Further, when the third partial inverted image 65 is selected by the selector 30, the reference image 63 must be inverted in both the vertical and the horizontal directions. Accordingly, the image setting portion 15 switches the polarities of the horizontal and the vertical deflection voltages to invert the reference image 63 in the horizontal and the vertical directions.

In addition, when the second partial inverted image 67 is selected by the selector 30, the reference image 63 may be vertically inverted. Accordingly, the selector 30 switches the polarity of the vertical deflection voltage to vertically invert the reference image 63.

Finally, when the first partial inverted image 69 is selected by the selector 30, the reference image 63 may be horizontally inverted. Therefore, the image setting portion 15 inverts or switches the polarity of the horizontal deflection voltage to horizontally invert the reference image 63.

As described above, the memory unit 19 stores images corresponding to the setting state of the projection image display or projector device. Therefore, the setting state or the projected image can be easily selected only by selection of the correct image branch from the actual image projected on the screen as shown in FIG. 8.

As explained above, according to the present invention, the projection image display device is provided which is easy to handle without necessities of considering a setting state or determining an option meaning. Further, according to the present invention, it is possible to provide a method of switching an image displayed by the projection image display device to a proper direction.

In addition, according to the present invention, since there exists a character which is correctly viewed among options in any case of the device setting, no consideration is made about the setting state of the projection image display device. In other words, the normal image may be selected among the displayed images or combined images. Thus, the invention can provide the projection image display device which can appropriately switch the image with easy operation.

Further, according to the present invention, it is possible to provide a method of appropriately switching images displayed by the projection image display device to a proper direction.

While this invention has thus far been described in conjunction with a preferred embodiment thereof, it is possible for those skilled in the art to put this invention into practice in various other manners. For example, this invention is readily applicable to a projection image display device and a projection method which uses a liquid crystal device, although the CRT alone has been mentioned as the display device in the preferred embodiment.

What is claimed is:

1. A projection image display device for use in projecting an image on a screen, comprising:

memory means for storing reference display information representative of a reference image and inverted display information representative of an inverted image obtained by inverting the reference image in a predetermined direction, to produce combined display information representative of combination of the reference image and the inverted image; and display means for projecting the combined display information onto the screen to display the combined image on the screen.

2. A projection image display device as claimed in claim 1, wherein the predetermined direction is a horizontal direction and the inverted image is inverted in the horizontal direction.

3. A projection image display device as claimed in claim 1, wherein the predetermined direction is a vertical direction and the inverted image is inverted in the vertical direction.

4. A projection image display device as claimed in claim 1, wherein the predetermined direction is both horizontal and vertical directions and the inverted image is inverted in both the horizontal and the vertical directions.

5. A projection image display device as claimed in claim 1, wherein the predetermined direction is both horizontal and vertical directions and the inverted image is composed of first, second, and third partial inverted images which are inverted in the vertical direction, in the horizontal direction, and both the horizontal and the vertical directions, respectively.

6. A projection image display device as claimed in claim 5, wherein the reference image and the first through the third partial inverted images are displayed on the screen as the combined image in the form of options.

7. A projection image display device as claimed in claim 6, wherein the display means is operable to selectively display the image in a reference mode for the reference image and in first through third inverted modes for the first through the third partial inverted images;

the projection image display device further comprising:

means for responding to selection of one of the options displayed on the screen to produce a switching signal corresponding to the selected option;

operating means responsive to the switching signal for operating the display means in a selected one of the reference mode and the first through the third inverted modes that is specified by the switching signal.

8. A projection image display device as claimed in claim 1, wherein the reference image is asymmetric with respect to the predetermined direction.

9. A method of switching an image of a projection image display device to a proper direction, comprising the steps of:

storing reference display information representative of a reference image and inverted display information representative of an inverted image obtained by inverting the reference image in a predetermined direction;

producing combined display information representative of combination of the reference image and the inverted image; and projecting the combined display information onto the screen to display the combined image on the screen in the proper direction.

10. A method as claimed in claim 9, wherein the predetermined direction is a horizontal direction and the inverted image is inverted in the horizontal direction.

11. A method as claimed in claim 9, wherein the predetermined direction is a vertical direction and the inverted image is inverted in the vertical direction.

12. A method as claimed in claim 9, wherein the predetermined direction is both horizontal and vertical directions and the inverted image is inverted in both the horizontal and the vertical directions.

13. A method as claimed in claim 9, wherein the predetermined direction is both horizontal and vertical directions and the inverted image is composed of first, second, and third partial inverted images which are inverted in the vertical direction, in the horizontal direction, and both the horizontal and the vertical directions, respectively.

14. A method as claimed in claim 13, wherein the reference image and the first through the third partial inverted images are displayed on the screen as the combined image in the form of options.

15. A method as claimed in claim 14, further comprising the step of:
   selecting one of the reference image and the first through the third partial inverted images; and
   displaying an image in consideration of one of the reference image and the first through the third partial inverted images.

* * * * *